(12) United States Patent
Wong (10) Patent No.: US 9,245,654 B2
(45) Date of Patent: Jan. 26, 2016

(54) ROTATING HIGH-DENSITY FUSION REACTOR FOR ANEUTRONIC AND NEUTRONIC FUSION

(71) Applicant: Alfred Y. Wong, Los Angeles, CA (US)

(72) Inventor: Alfred Y. Wong, Los Angeles, CA (US)

(73) Assignee: Nonlinear Ion Dynamics, LLC, Monterey, CA (US)

( * ) Notice: Subject to any disclaimer, the term of this patent is extended or adjusted under 35 U.S.C. 154(b) by 0 days.

(21) Appl. No.: 14/205,339

(22) Filed: Mar. 11, 2014

(65) Prior Publication Data

US 2014/0219407 A1    Aug. 7, 2014

Related U.S. Application Data

(63) Continuation-in-part of application No. 12/850,633, filed on Aug. 5, 2010, which is a continuation-in-part of application No. 12/783,550, filed on May 19, 2010, now Pat. No. 8,298,318.

(60) Provisional application No. 61/776,592, filed on Mar. 11, 2013, provisional application No. 61/179,625, filed on May 19, 2009.

(51) Int. Cl.
    *G21B 1/05*   (2006.01)

(52) U.S. Cl.
    CPC  *G21B 1/05* (2013.01); *Y02E 30/126* (2013.01)

(58) Field of Classification Search
    USPC ................................. 376/108, 139
    See application file for complete search history.

(56) References Cited

U.S. PATENT DOCUMENTS

| 3,014,857 | A  | * | 12/1961 | Gow et al. | ........... | 376/130 |
| 4,767,590 | A  | * | 8/1988  | Stix et al. | ........... | 376/133 |
| 6,891,911 | B2 | * | 5/2005  | Rostoker et al. | ........... | 376/128 |

* cited by examiner

*Primary Examiner* — Jack W Keith
*Assistant Examiner* — Sean P Burke
(74) *Attorney, Agent, or Firm* — Vorys, Sater, Seymour and Pease LLP; Vincent M DeLuca (57) ABSTRACT

A fusion device produces fusion of neutral atoms and ions in an "aneutronic fusion" manner without neutrons as products utilizes strong ion-neutral coupling at high neutral densities. Ions and neutrals rotate together in a cylindrical chamber due to frequent collisions. High magnetic forces make the attainment of high rotation energy possible; the magnetic field in a medium can be set at very high values because of the absence of magnetic charges. The repeated acceleration by strong magnetic forces in the azimuthal direction makes possible very high ion velocity. Fusion takes place mainly between neutral particles. This approach can be applied to fusion with neutrons as well. Conventional fusion schemes and neutron sources can be realized using the principles described above in the generation of neutrals of high energies and densities.

14 Claims, 8 Drawing Sheets

ROTATING HIGH-DENSITY FUSION REACTOR FOR ANEUTRONIC AND NEUTRONIC FUSION

CROSS-REFERENCE TO RELATED APPLICATIONS AND CLAIM FOR PRIORITY

This application claims priority under 35 U.S.C. §119(e) from provisional application Ser. No. 61/776,592 filed Mar. 11, 2013. This application is also a continuation-in-part of copending application Ser. No. 12/850,633 filed Aug. 5, 2010, which is a continuation-in-part of application Ser. No. 12/783,550 filed on May 19, 2010, which claims priority under 35 U.S.C. §119(e) from provisional application Ser. No. 61/179,625 filed on May 19, 2009, the entire contents of which are incorporated herein by reference in their entirety.

BACKGROUND OF THE INVENTION

1. Field of the Invention

This invention describes an energy technology which utilizes neutrals to undergo fusion. It relates to the field of energy production from nuclear fusion in which two atoms fuse together into a third atom with the resultant release of energy, a consequence of mass being converted into energy.

This invention provides a new approach to the production of fusion energy using neutrals instead of charged particles. It describes how neutrals can be accelerated in a compact rotating configuration, thereby achieving repeated interactions among themselves.

2. Background

Fusion research has been going on since 1950's and the prospect for a commercial reactor is still many years away. The confinement of charged particles, the presence of instabilities and the large amount of energy required to sustain the reacting system at high temperatures all make this into one of the most challenging world-wide efforts. Many configurations have been proposed and tried to confine charged particles which are accelerated by electromagnetic means. No simple low-cost reactors have been realized today.

The present invention chooses to pursue fusion among neutrals in order to achieve very high density of particles for interactions, e.g. four orders of magnitude higher than is possible with charged particles. It uses the strong magnetic force (several thousands of newtons) on a current element to drive neutrals through the principle of ion-neutral coupling. The simple geometry and the compactness of the device makes it a breakthrough in the concept on fusion. Unlike charged particles, neutrals do not experience Coulomb repulsion as they approach each other until they reach subatomic dimensions. The cross sections of neutral-neutral interactions are therefore higher.

The high density of neutrals makes it possible to produce energy at a significant rate for commercial application. The rate of fusion is proportional to the square of the density. This technology is different from the present day usage of charged particles for fusion, where it is difficult to achieve high density due to the energy requirement on ionization and instabilities of a charged medium.

The high density of interacting particles makes it possible to attempt clean fusion where neutrons are not in the products. The advantages of such a fusion reactor are numerous, one of which is the siting of reactors in urban areas. Others are environmental considerations including low amount of nuclear wastes, low cost of fuels and the replacement of hydrocarbons as fuels, thereby eliminating the emission of greenhouse gases.

SUMMARY OF THE INVENTION

This device operates at high neutral densities in order to increase the rate of fusion reactions even for low cross sections of interacting elements. This rate is proportional to the square of neutral densities. In one embodiment these neutrals are driven to high velocities by a non-mechanical plasma rotor in an annular region bounded by two concentric electrodes in an axial magnetic field. A DC voltage is imposed between these electrodes to impart a radial DC current I which produces a force $\underline{F}=I\underline{L}\times\underline{B}$ in the azimuthal direction where $\underline{L}$ is the radial vector of length L along which the current flows.

The repeated interactions between hydrogen and boron atoms in the annular region produce sufficient fusion reactions to yield energetic helium nuclei which can be used in a direct conversion to electricity or a source of heat for energy production. The low % ionization, the high driving force F in thousands of newtons and the repeated interactions at high neutral densities combine to make this a system without pollution and minimal radioactive wastes. Hydrogen and boron are both plentiful and non-radioactive stable elements. The fusion product, energetic doubly-charged helium nuclei, lend themselves to direct conversion to electricity with high efficiency.

This device requires only a simple capital outlay consisting of a superconducting magnet and a DC power supply. It can operate in various sizes from 50 cm size to 10's meters, depending on the application.

Another aneutronic reactor uses the proton lithium (p-Li$^6$) reactions with products of He$^3$ and He$^4$. The ease of coating of Li on electrodes inside chamber might be an advantage of sources and sinks in certain applications.

The above technology of using a predominant amount of neutrals can also be applied to D-T, D-D fusion where the products include neutrons. The capital investment and operation cost will be higher because of requirements for shielding and handling of radioactive materials. However the larger cross sections at lower energies of these fusion reactions compensate somewhat for this higher capitalization and operational cost.

DETAILED DESCRIPTION OF THE INVENTION

Figure 2:
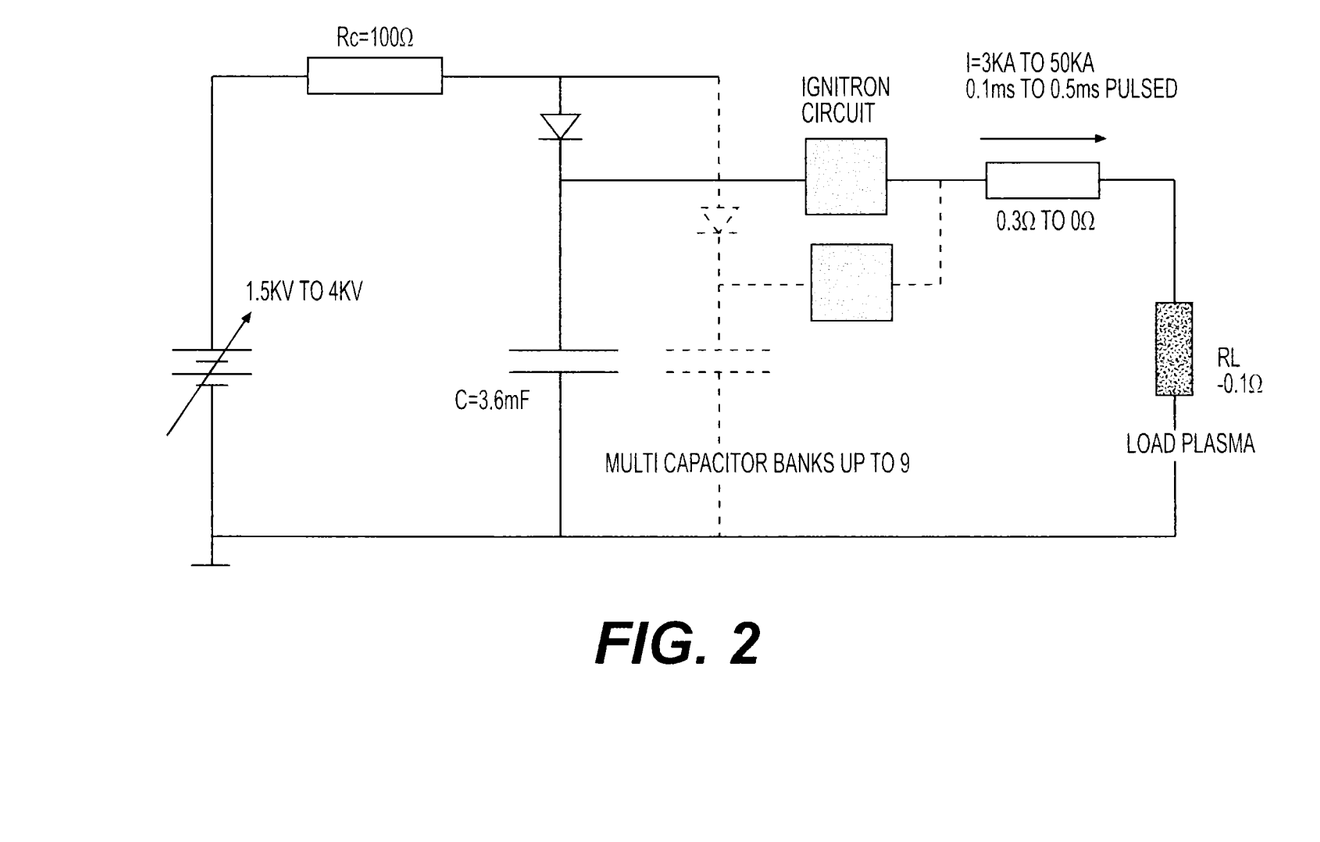
FIG. 2 shows a high current multi-triggering discharge circuit to extend pulse duration
Figure 3:
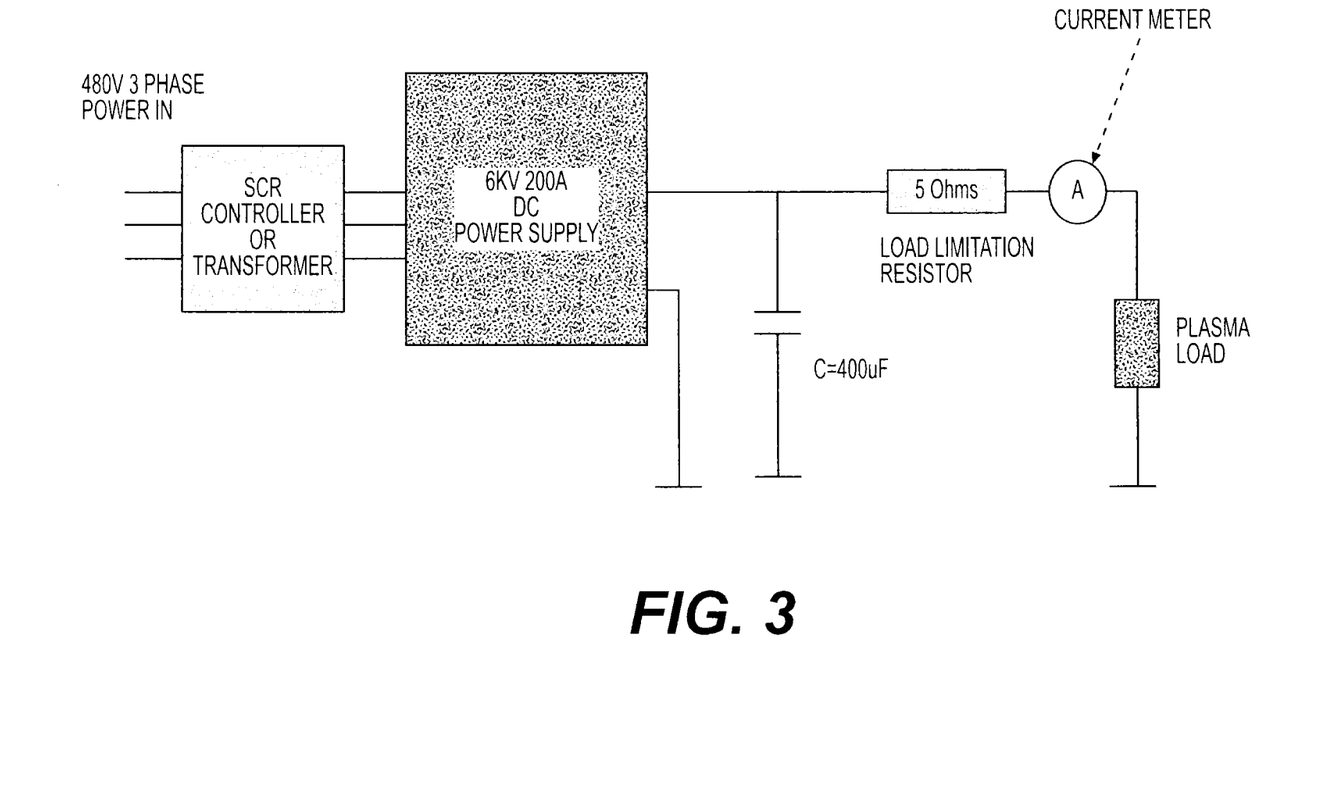
FIG. 3 shows a 6 kilovolt direct current power supply for continuous wave discharge.
Figure 4:
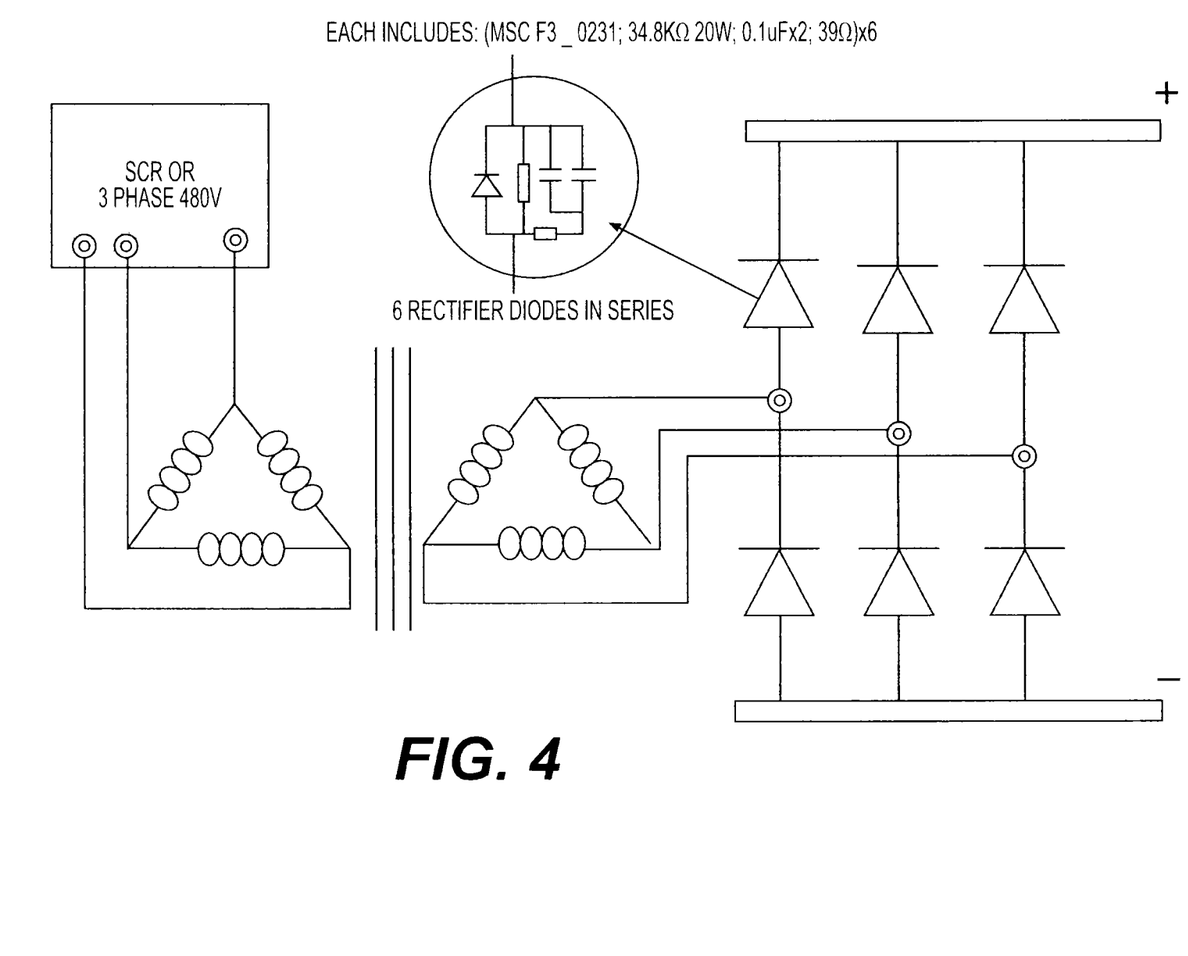
FIG. 4 shows a 6 kilovolt 200 amp direct current power supply circuit.
Figure 5:
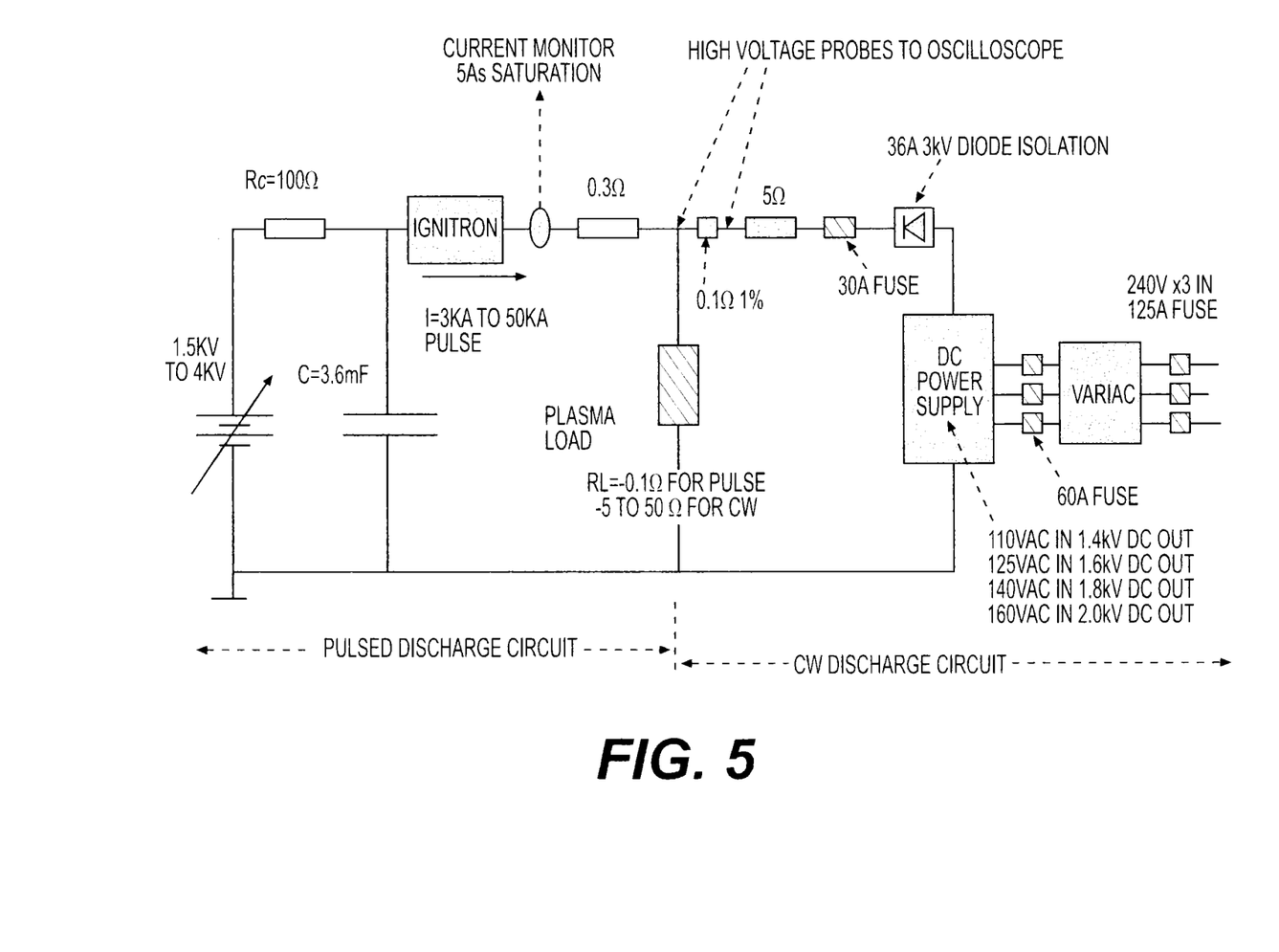
FIG. 5 shows a pulsed and continuous wave combination discharge circuit.

Typical designs of pulse supplies and CW supplies used to produce pre-ionization and sustained rotation of the plasma are illustrated in FIGS. 2-4.

Figure 1:
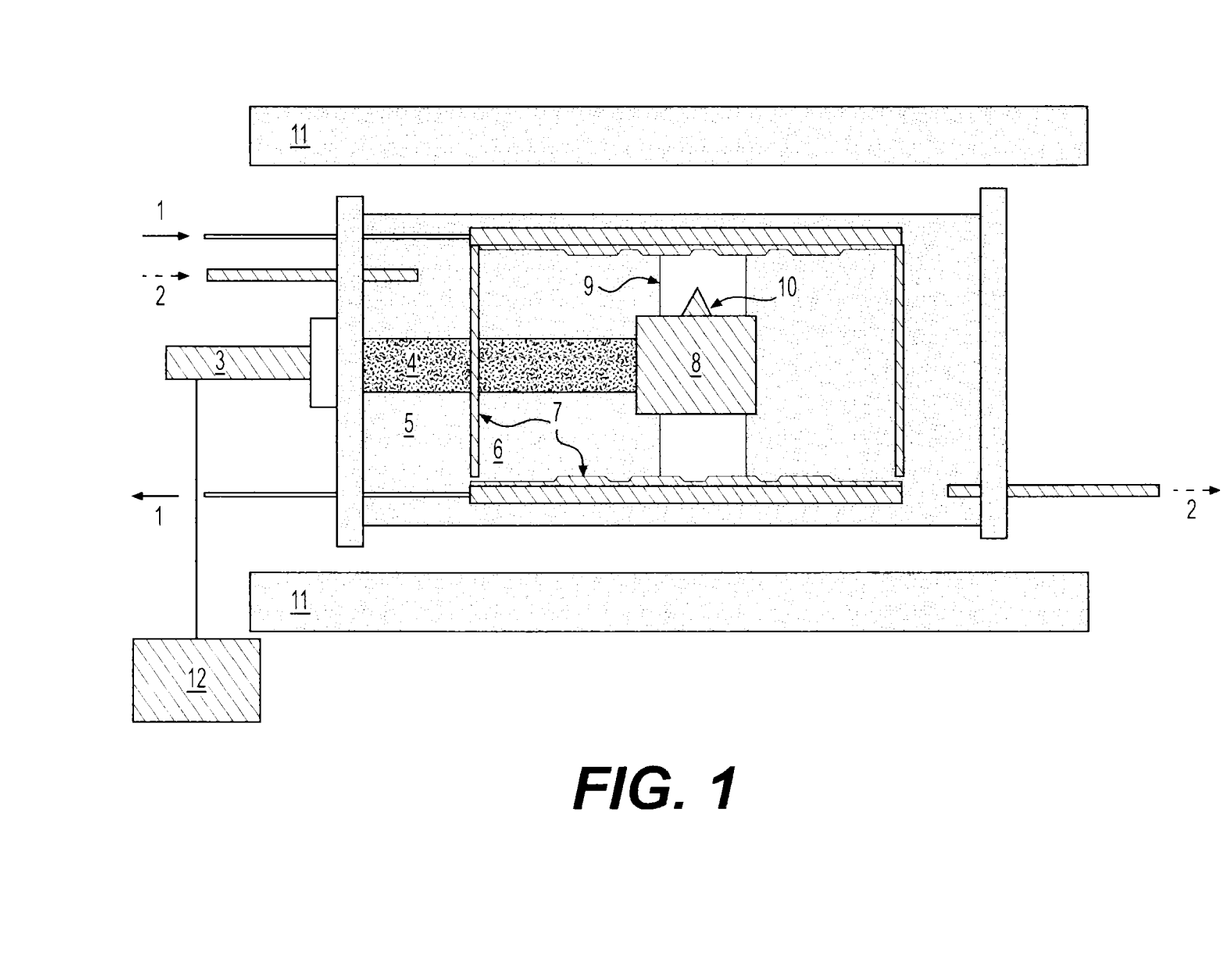
FIG. 1 shows one configuration of a p-B$^{11}$ fusion device with concentric electrodes.

FIG. 1 shows a configuration of a p-$B^{11}$ fusion device with concentric electrodes. A superconducting magnet 11 is provided capable of generating an axial magnetic field. The chamber 5 has a cooling input 1. The chamber 5 also has a gas input 2. An electrical power supply 12 is connected to discharge rod 3. An expanded discharge rod 8 is provided in chamber 5. Element 4 is an insulator. Element 6 is an external discharge rod. Element 7 denotes Boron discs. Element 10 illustrates a Boron target. Element 9 illustrates a plasma.

Multiple pulse supplies are triggered sequentially to produce a sequence of pulses for sustaining a high rotation rate. The timing of the pulses is such that before the conductivity of the plasma decays to a low value the next pulse is turned on to impart another radial current for rotation.

Figure 6:
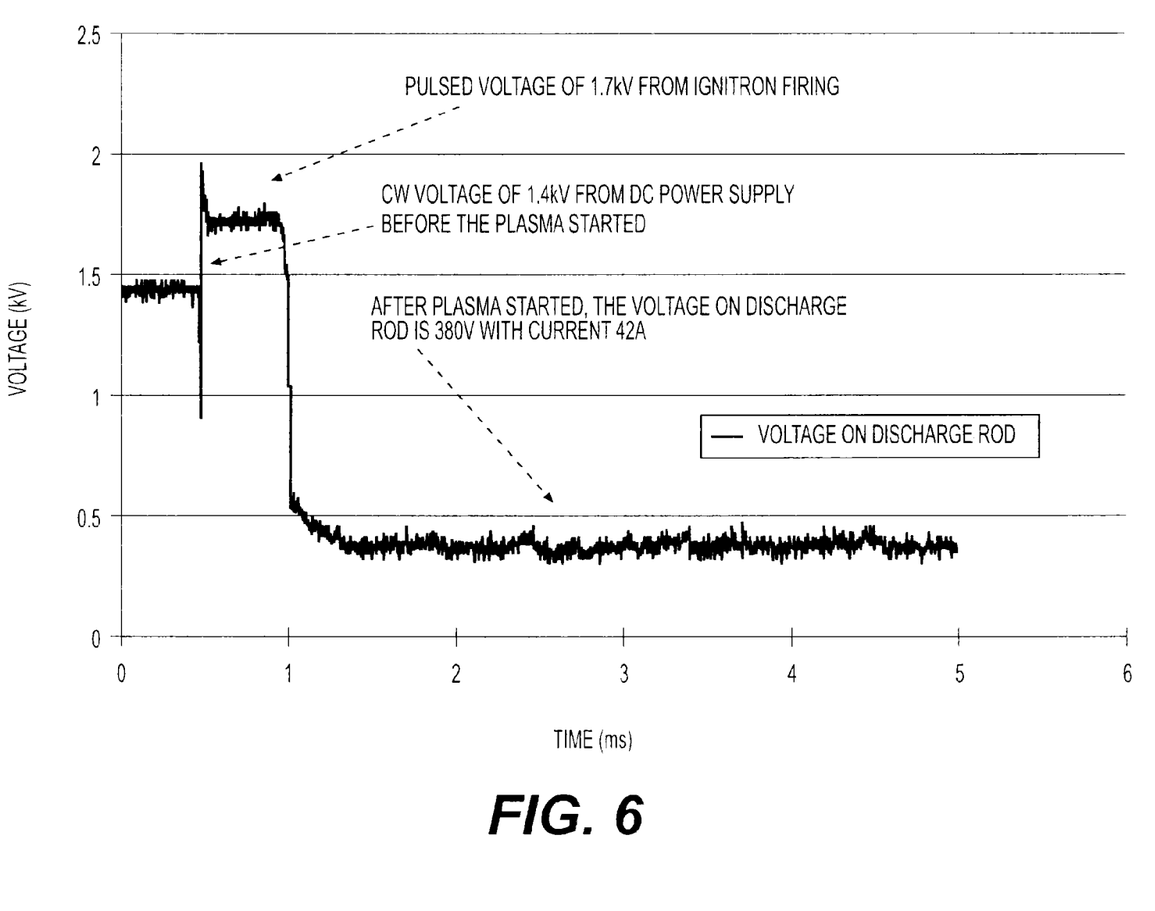
FIG. 6 shows a typical plasma discharge monitored on the central rod using the combination supply from FIG. 5.

After the initial breakdown to create the plasma current the voltage required to maintain the flow is lowered such as shown in FIG. 6, thereby lowering the power requirement. In this scheme only a low % ionization ($10^{-5}$) is required. The recombination rate between ions and electrons is minimum because of ions and electrons are surrounded by neutrals. The power to maintain such low % ionization is many times less than what is needed to maintain a fully ionized medium.

The rotations of neutrals and ions are diagnosed using a camera with fast shutter speeds up to 100,000/s. By following a given inhomogeneity the rotation rate can be estimated. Another method is to use "laser tagging". A laser is tuned to a given wavelength which matches either an ion line or a neutral line. The resonant scattering at a different wavelength is monitored in space and time using the fast camera with a filter. Alternately a spectrometer and a fiber tuned to a given wavelength can also be used.

Each element has both rotating and stationary distributions such that the rotating boron species collides with the stationary hydrogen species and vice versa. The stationary component of $B^{11}$ is provided at the inner and outer electrodes, while the rotating component $B^{11}$ is provided by J×B force. A continuous stream of hydrogen is fed from a pressure tank to produce background pressures of 1-10 Torr.

The repeated interactions between these rotating boron and stationary hydrogen and rotating hydrogen and stationary boron give rise to a high rate of fusion as represented in the following equation:

$$dW/dt = n_p n_b \sigma v Y \text{ rate of fusion/cm}^3 \text{ sec}$$

where $n_p$, $n_b$ are the densities of protons and borons respectively;

σ is the fusion cross section at a particular energy E v is the relative velocity between proton and boron, Y is the energy yield per fusion reaction=8.7 MeV It should be noted that $n_p$ represents both hydrogen ions and neutrals because for fusion reactions either neutrals or ions can participate in fusion.

The fusion break-even condition is given by the fusion output being greater than the energy input per unit volume:

$$dW/dt > V_{in} I_{in}/V$$

where $V_{in}$=Voltage applied between two concentric electrodes $I_{in}$=Radial current due to the applied voltage $V_{in}$ V=Volume of rotating region where neutrals and ions are being driven by J×B force; energy input comes from the DC voltage and current applied between the two electrodes.

The operating magnetic field is usually between 0.5-3 T. Initial ionization by electrons along the axial magnetic field might be used to provide electrons and ions for pre-ionization. The plasma impedance between the two concentric cylinders is lowered such that a radial current flows between the concentric cylinders. This radial discharge current across the magnetic field takes place primarily via ion transport across the strong magnetic field because ions have much larger orbit than electrons. The force J×B causes ions to rotate in the azimuthal direction. At high densities frequent collisions between ions and neutrals make them rotate together.

In our laboratory plasma a 0.1 ohm resistance and a radial current of 10 KA were observed for a voltage of 1 KV. This current gives rise to a force of 10,000 newtons in a field of 2 T and a radius of 50 cm. Under this strong driving force Boron ions and neutrals can attain an energy of 100 KeV in 10 ms. This range of energy allows fusion to take place.

Boron atoms rotating at $3 \times 10^5$ revolutions/s at a radius of 50 cm will reach the energy of 100 KeV. Hydrogen-Boron fusion reaction can occur when high-pressure hydrogen gas is puffed in towards the rotating annular region of Boron. The high densities ($10^{18}$/cm$^3$) of neutral boron and hydrogen atoms help sustain a significant fusion yield even though the cross section is only $3 \times 10^{-28}$ cm$^2$.

In the rotating region where all the particles rotate at the same rate, assuming a solid body rotation, there will be low relative velocities among elements for fusion unless the Coulomb barrier is reduced by electron screening as explained below. However without such reduction the relative velocities between rotating Boron and ambient hydrogen atoms would be required to be high enough for fusion to take place. A rate of reaction depends on the energy of $B^{11}$ and hydrogen. The device can be operated at high neutral densities of hydrogen and boron because instabilities due to space charges are not present. A high voltage is applied either in pulses or steady state or a combination of both pulses and steady voltages, with a resultant radial current flowing between the discharge rod 8 and the discharge rod 6, which function as electrodes. The radial current produces a strong torque to push ions in the azimuthal direction, causing collisions with neutrals and co-rotation of the neutrals with the ions. The power supply further produces a continuous chain of pulses, such that the radial current is sustained so as to produce a continuous driving force to rotate ion and neutrals. A combination of pulses and CW voltages are used to maximize the efficiency between rotating energy and the input electrical energy; pulses are used to sustain the number of ions in the system and CW voltages are used to maintain the rotation. The fusion reaction produces energetic alpha particles ($He^4$), which are used for direct conversion to electrical energy; and the slowing down of these alphas yields a charging current in a power supply.

If we take $n_p$, $n_b = 10^{18}$/cm$^3$ and $\sigma = 3 \times 10^{-28}$ cm$^2$ (assumed 100 KeV of energy for Boron) and relative speed between hydrogen and boron $v = 10^8$ cm/s we have $dW/dt = 3 \times 10^{16}$/s cm$^3 \times 8.7$ MeV$= 5 \times 10^3$ J/s cm$^3$ Our proof-of-principle experiment lasts for 1 ms in a volume of $3 \times 10^3$ cm$^3$ the power released is estimated to be 15 KJ.

The energy input is 2.5 KV and 4000 A or 10 MW for 0.1 ms which is equal to 1 KJ.

If we can accelerate borons to 200 KeV the cross section is increased to $1.5 \times 10^{-26}$ cm$^2$ or 30 fold increase in cross section. If the energy input is doubled then the energy multiplication is estimated to be approximately 200.

Number of He Nuclei to be Detected

The number of total reactions in 1 ms in a volume of $3 \times 10^3$ cm$^3$ is equal to $9 \times 10^{16}$. The product of reactions in He nuclei is $2.7 \times 10^{17}$.

The density of He particles is $0.9 \times 10^{14}$/cm$^3$ or $10^{-3}$ Torr/ms pulse. This density of He is detectable by a quadrupole mass spectrometer of RGA (residual gas analyzer). The population of He particles is increased with the number of pulses, when the volume is not pumped.

A method of estimating the maximum velocity of rotation of neutrals gained during the acceleration by J×B force or I L B where I is the radial current, L is the length of the current and B is the field perpendicular to I is as follows:

For our current pulsed experiments where helium is to be observed optically the following parameters are used: $I=10^4$ A, L=0.5 m, B=3 T F=$1.5 \times 10^4$ N Acceleration is F/m=$0.5 \times 10^9$ m/s$^2$, where m is the mass of borons and hydrogen at density of $10^{18}$/cm$^3$ and is equal to $3.3 \times 10^{-5}$ kg.

For 2 ms of acceleration v=½ at=$10^6$ m/s. This justifies the assumption of v=$10^8$ cm/s assumed above in our calculation of fusion events. This velocity corresponds to Boron energy of 100 KeV.

For hydrogen-boron fusion the cross sections "sigma" are:
At 200 KeV sigma is $1.6 \times 10^{-2}$ Barn
At 100 KeV sigma is $3 \times 10^{-4}$ Barn
At 50 KeV sigma is $10^{-6}$ Barn
1 barn is $10^{-24}$ cm$^2$.

For DD reactions the fusion cross section is:
At 50 KeV sigma is $10^4$ barns

For DT reactions the fusion cross section is
At 10 KeV sigma is $10^5$ barns

Additional Embodiments

Applicable Fusion Reactions

The embodiments above primarily consider the p-B$^{11}$ fusion reaction, involving hydrogen nuclei (protons) and boron nuclei, as described by the equation:

$$p + B^{11} \rightarrow 3He^4 + 8.68 \text{ MeV}$$

The reactants (e.g., hydrogen and boron) may be in solid (powder, nanoparticles, or other), liquid, or gaseous state, may be mixed in a solution with water or any other solvent, and may be present in elemental form or in any chemical compound. For example, boron is often found in borate minerals, including borax, kernite, ulexite, colemanite, and boracite, any of which could be used to provide boron fuel into the fusion reactor described above (hereinafter referred to as the "Alpha Unit"). In addition, other boron compounds which are not borate minerals, including but not limited to elemental boron, lanthanum hexaboride, and boron nitride, could be used.

Additionally, the Alpha Unit is suitable for use with all other fusion reactions, both neutronic and aneutronic, including (but not limited to):

D+T→He$^4$+n+17.59 MeV
D+D→T+p+4.04 MeV
D+D→He$^3$+n+3.27 MeV
D+D→He$^4$+γ+23.85 MeV
T+T→He$^4$+2n+11.33 MeV
D+He$^3$→He$^4$+p+18.35 MeV
p+Li$^6$→He$^4$+He$^3$+4.02 MeV
p+Li$^7$→2He$^4$+17.35 MeV
p+p→D+e$^+$+ν+1.44 MeV
D+p→He$^3$+γ+5.49 MeV
He$^3$+He$^3$→He$^4$+2p+12.86 MeV
p+C$^{12}$→N$^{13}$+γ+1.94 MeV
[N$^{13}$→C$^{13}$+e$^+$+ν+γ+2.22 MeV]
p+C$^{13}$→N$^{14}$+γ+7.55 MeV
p+N$^{14}$→O$^{15}$+γ+7.29 MeV
[O$^{15}$→N$^{15}$+e$^+$+ν+γ+2.76 MeV]
p+N$^{15}$→C$^{12}$+He$^4$+4.97 MeV
C$^{12}$+C$^{12}$→Na$^{23}$+p+2.24 MeV
C$^{12}$+C$^{12}$→Na$^{20}$+He$^4$+4.62 MeV
C$^{12}$+C$^{12}$→Mg$^{24}$+γ+13.93 MeV

Continuous vs. Batched Operation

Because all fusion reactions involve the consumption of fuel, to continue operating indefinitely the Alpha Unit must have its fuel supply replenished. There are two ways of achieving this:

1) Continuous operation, whereby fuel is added and fusion products are removed continuously. In this mode of operation, the Alpha Unit would only need to be shut down for maintenance, or in cases of operational failure.

2) Batched operation, whereby fuel is added prior to operation, the Alpha Unit is run, and operations are ceased when a certain proportion of the fuel (up to 100%) has been consumed. Once the device has stopped operating, the fusion products would be removed, new fuel added, and, as needed, maintenance performed. This mode of operation would require more operational cessations than the continuous mode of operation, but would simplify the fuel loading and fusion product removal processes.

Pulsed vs. Continuous Voltage

In past operation, the reactions in the Alpha Unit have been prompted by a series of short-duration pulses of voltage on the inner electrode to induce a plasma current between the inner and outer electrodes and cause the fluid inside the Alpha Unit to rotate. However, as an alternative, the Alpha Unit could be run with a continuous supply of voltage to the inner electrode.

Fusion/Fission Hybrids

Some fission reactions, for example the thorium fission cycle, rely on a large flow of high-energy particles (e.g., neutrons, protons, alpha particles) to drive the reaction. Such reactions may have advantages over conventional nuclear fission fuel cycles in that they involve only trace amounts of radioactive material, which are insufficient to drive a nuclear chain reaction The Alpha Unit could be used to drive these fission reactions by providing the supply of high-energy particles. For example, when using the p-B11 reaction, a mixture of doubly-charged He4 (α particles), and charged and neutral boron and hydrogen nuclei could be directed out of the Alpha Unit and into a separate reactor containing the fission fuel. The energy generated by the fission reaction could be used independently from, or in combination with, energy extracted from the Alpha Unit (for electricity generation, industrial heat, or other useful purposes).

Materials of Construction

A key component of the Alpha Unit is a magnet which could be a superconducting magnet (including use of same from retrofitted MRI machines), a permanent magnet, an electromagnet or other suitable type of magnet. The other components consist of a chamber wall, and an outer and an inner electrode. Auxiliary components such as a power supply, fuel input rod, and cooling systems may also be present.

In general, structural integrity and tolerance to high temperatures will be important criteria in selecting materials of construction. In the case of the electrodes, high conductivity will also be a critical factor. As a result, metals are likely to be ideal for some or all of the components. However, alternatives such as composites, ceramics, or plastics may also be useful in some cases. The design of the Alpha Unit is not specific to any one set of materials.

Elimination of Components

The design of the Alpha Unit described above includes an inner and outer electrode to conduct a plasma current, as well as a superconducting magnet to create an axial magnetic field. However, it is possible to eliminate one or more of these components by using a current drive. For example, rotation could be induced by creating an AC magnetic field with a rotating current, causing ions to rotate via resonant coupling, and eliminating the need for a magnet and inner electrode.

Geometry and Scale

The embodiments above envision the Alpha Unit as a cylinder. While this may well be an optimal design, the Alpha Unit could also be operated with other geometries, such as an oval cross-section, or a torus, so long as particles are able to rotate around the device.

Since fusion reactions happen on a nuclear level (~10-15 m), there is almost no fundamental limit to the scale (large and small) at which an Alpha Unit could be implemented. For example, an Alpha Unit might be applied on a nano-level, such that it could be used to provide power to electronic circuitry, or for other purposes; or implemented on a very large scale where it could, for example, satisfy the electricity requirements of entire cities, regions or countries using one or more Alpha Units. Changes in scale could be achieved by increasing or decreasing the length of the Alpha Unit, increasing or decreasing its diameter, doing both, or (in the case of scaling up) by using multiple modules. Similar adjustments could be made to versions of the Alpha Unit with non-cylindrical geometries.

Energy Extraction

Direct Energy Conversion

Many fusion reactions produce high-energy charged particles, which can be directly converted to usable electricity using electromagnetic means (e.g., by inducing an electrical current in a nearby wire).). Charged particles from fusion have energy in the MeV range and have low collision frequencies with background medium and therefore undergo motion dictated by the background electric and magnetic fields, even in a normally collisional environment. One notable concept developed by researchers at Lawrence Livermore National Laboratory involves charged particles being selectively removed, guided away from the plasma in which fusion reactions are taking place using a magnetic field, and decelerated by retarding electric fields. The energy given up by the particles during deceleration is converted to an electrical current. Such a concept could be used with the Alpha Unit, either independently or in combination with other direct energy conversion techniques and/or thermal energy conversion techniques. The direct energy conversion could be significantly more efficient at producing electrical energy than the maximum efficiency of a thermal energy conversion technique. Several novel adaptations of the Alpha Unit to create direct energy conversion are proposed herein, and are listed and described below.

Charged particles (for example, doubly-charged $He^4$ ($\alpha$ particles) move axially, as a result of their high energy, in addition to high-speed azimuthal rotation induced by the magnetic field and plasma current in the Alpha Unit. Charged particles created as a product of fusion reactions have much higher energy than other charged particles or neutrals which are not produced by fusion reactions. Thus, these high-energy charged particles (such as a particles in the case of the $p-B^{11}$ reaction) move axially at much higher average speeds than other particles in the Alpha Unit. This axial movement of charged particles may be directly converted to electricity, for example by creating an electric field opposing the flow of charges outward from the electrodes.

Additionally, the kinetic energy of charged particles rotating azimuthally can be captured by similar means. For example, the batteries or electric fields referred to above can be used to create an electric field opposing the rotation of charged particles. These batteries could be placed about the section of the Alpha Unit containing the electrodes and/or about the sections without the electrodes. This could be done separately from, or in conjunction with, the system described above.

To optimize direct energy conversion, it is desirable to control the path of the charged fusion products (e.g., alpha particles). One way to do this is to overlay the cyclotron frequency of the alpha particles on top of a DC voltage created on the inner electrode, generating an electromagnetic wave at the cyclotron frequency. By tuning the phase of this electromagnetic wave at the cyclotron frequency, it is possible to adjust the paths of the charged fusion products such that they rotate in a controlled fashion, allowing direct energy conversion to be optimized.

Similarly, resonance with the intrinsic nuclear spin of the fuel or product nuclei (for example, hydrogen, boron, and helium in the case of the $p-B^{11}$ reaction) may be used to increase or decrease the number of fusion reactions or control the paths of the particles in such a way as to increase the efficiency of energy recovery.

The radius of the chamber to either side of the electrodes may be kept the same as in the section containing the electrodes, or it may be larger or smaller. For example, the radius of the chamber might be increased in the direction axially away from the section containing the electrodes, and the resonant frequency of fusion products (for example, alpha particles in the case of the p-B11 reaction) could be used to excite them to rotate in increasingly large orbits as they move axially away from the electrodes. This could result in enhanced efficiency and efficacy of the direct energy conversion.

In any direct energy conversion scheme, it is likely to be desirable to minimize the density of neutrals near charged fusion products (for example, in the case of the p-B11 reaction, minimizing the density of neutrals near the charged alpha particles) to reduce the transfer of charged particle energy to neutrals (since the reduced charged particle energy will reduce the energy available for recovery at higher efficiencies by means of direct energy conversion rather than at lower efficiency with a thermal process). However, it is desirable to increase the density of neutrals near charged fuel particles (for example, hydrogen/protons in the case of the $p-B^{11}$ reaction) so as to induce the reaction in the first place. Several configurations, listed below, may be used to optimize this situation, either independently or in combination with one another.

Fuel (for example, hydrogen) can be introduced directly into the annular space between the two electrodes in controlled amounts during operation. Much of this fuel will be consumed before it escapes the section of the Alpha Unit containing the electrodes, or is able to enter the annular space between the outer electrode and the chamber wall. Charged fusion products (e.g., alpha particles) which enter these portions of the Alpha Unit will thus encounter few fuel particles (the vast majority of which are neutral).

Fuel (for example, hydrogen) can be introduced into the Alpha Unit in a short, controlled burst, perhaps injected in the radial direction. A vacuum could be drawn, perhaps from the annular space between the inner and outer electrodes, to remove particles. Because highly charged fusion products (e.g., alpha particles) are more likely to exit this annulus than lower-energy fuel particles, the vacuum would draw out a disproportionately low fraction of fusion products. As a result, the fusion products remaining in the Alpha Unit would encounter few neutrals, allowing for greater direct conversion of energy.

Figure 7:
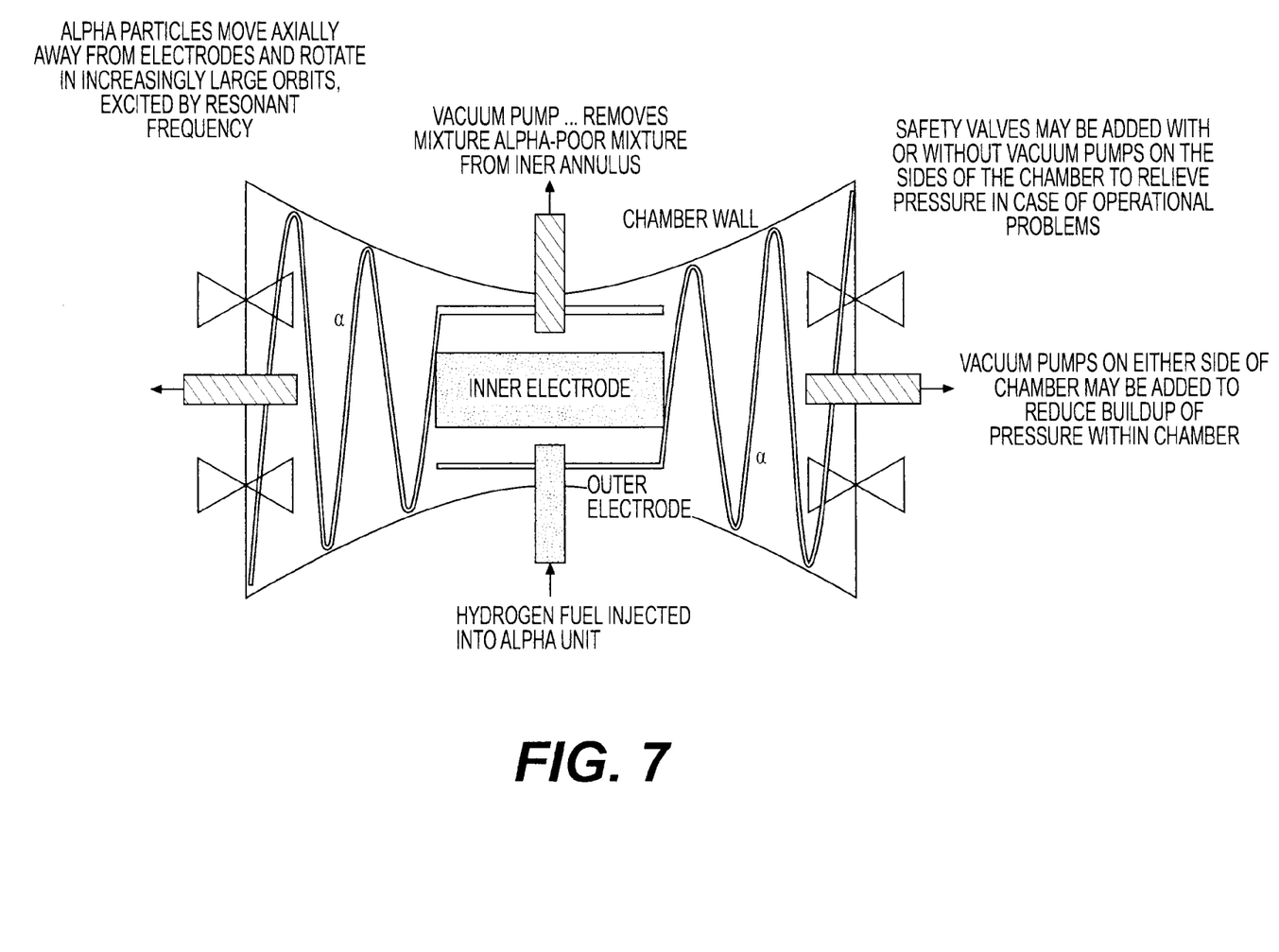
FIG. 7 shows an alternate configuration of a fusion reactor in accordance with the present invention.

A schematic drawing of a potential Alpha Unit configuration, including a chamber of varying radius as described above, is shown in FIG. 7. The drawing assumes the use of a p-$B^{11}$ reaction, although other reactions could be used. The drawing also includes vacuum pumps and safety valves on either side of the chamber, which could be used to avoid unsafe pressure buildup within the Alpha Unit.

Since the proportion of charged fusion products relative to neutrals within the annular space between the two electrodes is likely to be different from that proportion in other spaces within the Alpha Unit, the dimension of the inner electrode, outer electrode, and chamber wall may be modified to change the volumes of these spaces relative to one another and reduce the incidence of charged fusion products colliding with neutrals. Control systems and outer annular space geometry may be optimized to facilitate gas evacuation so as to minimize charged particle collisions with neutral particles thereby minimize otherwise avoidable energy transfer.

Thermal Energy Conversion

The energy produced during fusion reactions which is not captured using direct energy conversion will become thermal energy. Capture of this thermal energy can be independent from, or performed in combination with, direct energy conversion. Thermal energy capture is a common practice in commercial applications (for example, fossil fuel-fired power plants), and it could be done on the Alpha Unit in much the same way. A working fluid (e.g., water, helium, sodium) could be passed through thermal coils, thermal jackets, or other heat transfer devices located within or around the Alpha Unit to absorb thermal energy. The hot working fluid passed out of the Alpha Unit could then be used with any number of devices to convert its thermal energy into mechanical motion directly or by means of a secondary loop. The mechanical motion of these devices could be used directly (e.g., to turn a wheel), or indirectly (e.g., to turn a conventional generator to produce electricity). These devices include, but are not limited to, the following:

Steam turbine

Stirling engine (either to drive a separate electric generator or to have the piston in the Stirling engine fashioned as a magnet so as to create electricity from the motion of the magnet)

Free piston engine

Thermocouple

A single device listed above could be used, or one or more devices could be used in combination with each other. One or more devices could also be used for secondary, tertiary, etc. thermal energy recovery using waste heat from other devices. Alternatively, the thermal energy could be used directly to supply heat for industrial processes, for space heating in buildings or for water desalination.

An Alpha Unit could also be used in combination with a separate heat transfer device to provide auxiliary heat. For example, thermal energy from the Alpha Unit could be added to the combustor or inlet section of a combustion turbine, either by placing the Alpha Unit within such section or by transferring the heat using a working fluid. Similarly, the Alpha Unit could be used as an auxiliary heat source for a conventional thermal power plant, either to pre-heat steam or another working fluid passed into the boiler, or by adding the heat directly to the boiler.

Fuel Supply

Fusion fuel can be supplied to the Alpha Unit using purchased materials (for example, in the case of the p-$B^{11}$ reaction, using pressurized hydrogen gas cylinders and solid pieces of boron compound, amongst other options). Alternatively, it may be possible to integrate one or more devices to provide fuel. For example:

Hydrogen for the p-$B^{11}$ reaction could be supplied with an electrolysis system or a thermal dissociation system integrated with an Alpha Unit and powered by the Alpha Unit, or by a smaller, auxiliary Alpha Unit, or by a separate source of electricity.

Figure 8:
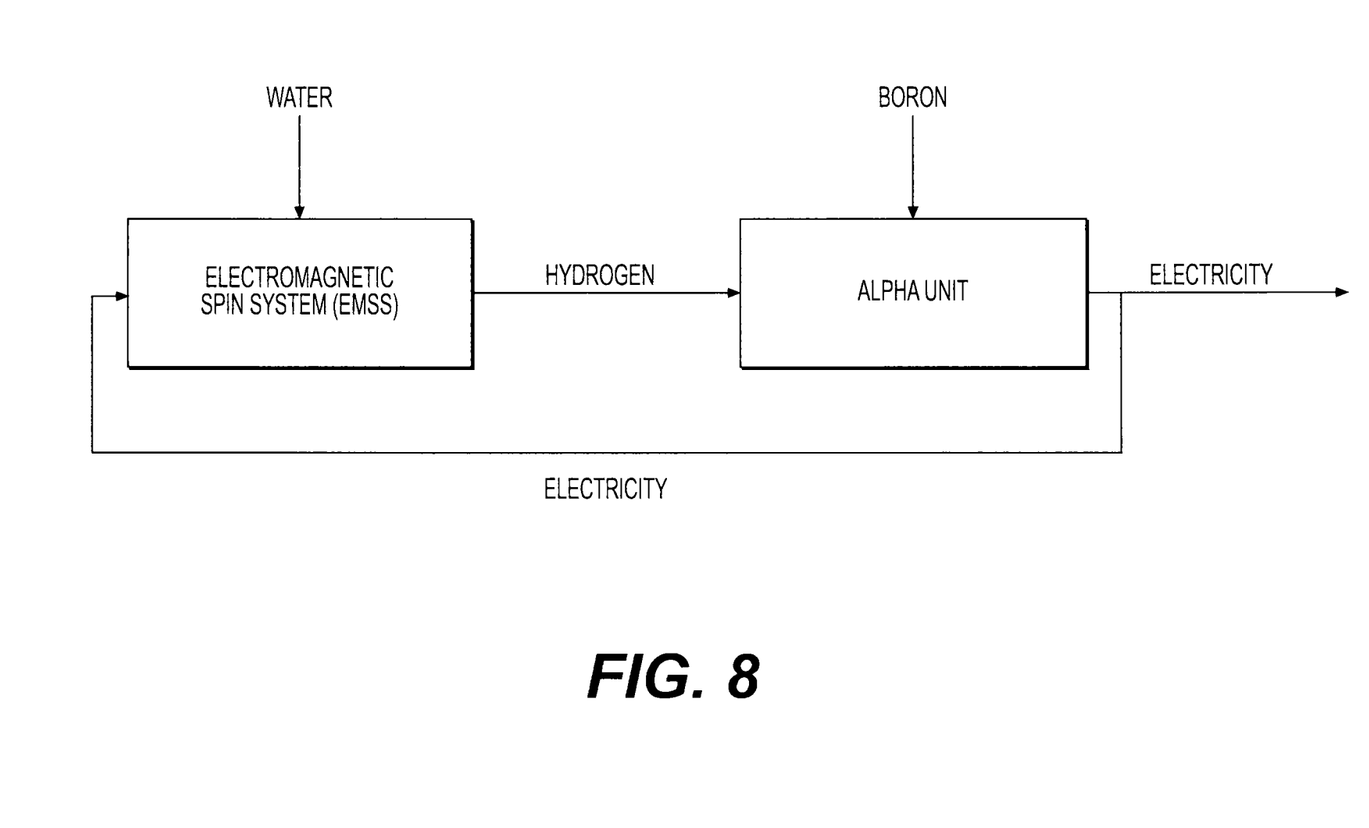
FIG. 8 shows a schematic diagram of a system for supplying hydrogen to a fusion device in accordance with the present invention.

Hydrogen for the p-$B^{11}$ reaction could be supplied using an integrated spin system (as described in U.S. Pat. No. 8,298,318 and US Patent Publication No. 2013/0047783, both incorporated herein by reference in their entireties) whereby water, or another compound containing hydrogen, would be rotated at a rate sufficient to separate the hydrogen from the other elements in the compound. A schematic diagram illustrating this concept is shown in FIG. 8. As shown, a supply of water is applied to the electromagnetic spin system (EMSS—described in detail in the '318 and '783 documents), which produces a supply of hydrogen. The hydrogen is supplied to an Alpha Unit, together with Boron, which are used in a fusion reaction to generate electricity. Part of the electricity produced is used to operate the EMSS.

Hydrogen for the p-$B^{11}$ reaction could also be supplied by using compounds such as sodium borohydride, which produces hydrogen when mixed with water.

By creating the hydrogen by means of a system ancillary to the Alpha Unit, the fueling of the Alpha Unit will not be dependent upon a hydrogen fuel tank nor upon the development of hydrogen fueling infrastructure. Similar techniques could be used to integrate production of non-hydrogen fusion fuels with the Alpha Unit, eliminating the need to develop specialized fueling infrastructures for those compounds as well.

Positive Feedback Mechanisms

Space Charge Effect

Results of operating the Alpha Unit with the p-$B^{11}$ reaction suggest that operation of the device is enhanced by a space charge effect. Many boron compounds (as well as materials which do not contain boron) will emit electrons when heated. The intense centrifugal force present within the device causes these electrons to form a "cloud" near the wall of the outer electrode. This electron cloud—a space charge—attracts ions, which in the operation of the Alpha Units have included both boron and hydrogen ions. As a result, the boron and hydrogen ions are drawn into close contact in this "negative potential well." The close contact of the nuclei in this well increases the probability of quantum tunneling, effectively reducing the Coulomb barrier and intensifying the rate of fusion reactions. The thermal energy generated by these fusion reactions further heats the boron compound, causing it to emit more electrons and further increasing the rate of reactions.

Ionization of Fuel Particles

In addition to the space charge effect, operation of the Alpha Unit with the p-$B^{11}$ reaction has also revealed a phenomenon by which production of fusion products enhances the operation of the device. For example, when alpha particles are produced by p-boron fusion events, they tend to ionize hydrogen atoms. The greater ion density near the outer wall of the annulus of the Alpha Unit decreases the resistivity of the gaseous mixture, increasing the magnitude of the plasma current without consuming additional energy to increase the voltage of the inner electrode. The larger plasma current, in turn, increases the Lorentz force in the device, increasing rotational speeds and leading to more fusion events.

Positive Feedback

Together, the space charge effect and ionization of fuel particles create a positive feedback to enhance the operation of the Alpha Unit. When, in the case of the p-$B^{11}$ reaction, a boron compound is heated, it releases electrons that form a space charge near the outer electrode. The negative potential well created by this space charge brings boron and hydrogen into close contact, increasing the incidence of quantum tunneling, effectively lowering the Coulomb barrier, and increasing the rate of fusion reactions. The charged particles created by the reactions (e.g., alpha particles in the case of p-$B^{11}$) ionize fuel atoms (e.g., hydrogen in the case of p-$B^{11}$), reducing resistivity, increasing the plasma current and Lorentz force, and further increasing the rate of fusion reactions without an increase in energy input. The increased rate of fusion reactions, in turn, magnifies the space charge effect and fuel particle ionization, which leads to further fusion.

Enhancements to Encourage Positive Feedback

Since the positive feedback mechanisms help to drive performance of the Alpha Unit, enhancing the feedback is likely to be desirable. While some of the boron compounds we have used (e.g., boron nitride, lanthanum hexaboride) are good electron emitters, even better electron emitters exist, and these compounds could be used to increase the space charge effect. Excellent electron emitters, including but not limited to graphene, could be chemically combined with the fuel target (e.g., boron nitride), or could be fabricated as a composite with the fuel target (i.e., the fuel and electron emitter are physically but not chemically bonded). Additionally, this material (fuel target, with or without addition of electron emitter) could be adhered to the wall of the outer electrode (as in our past operation), or the outer electrode could itself be fabricated out of the material (such that the electrode would be gradually consumed by the fusion reactions). In alternate configurations of the device, the inner electrode, chamber wall, or other components of the Alpha Unit could be composed of consumable fusion fuel, or a composite or compound containing fusion fuel and other materials. Similarly, the design of the Alpha Unit could be optimized (e.g., by the choice of fuel compound, placement of the fuel, geometrical design of the electrodes and chamber) to enhance fuel particle ionization, further contributing to positive feedback.

Reaction Product Separation/Removal

In many cases, the materials created as a result of a fusion reaction will have no use once their energy has been removed to the extent desired through direct and/or thermal energy conversion, and may, in fact, inhibit the operation of the device. For example, in the p-$B^{11}$ reaction, helium created by the reaction may not be intended for any additional reactions, and its presence may reduce the number of p-boron reactions taking place. As a result, it may be desirable to selectively remove fusion products from the Alpha Unit to maintain high partial pressures of the reactants.

Such removal could take many forms, and could depend upon the particular reaction being used in the Alpha Unit. For example, commercial hydrogen filters exist which are selectively permeable to hydrogen but not larger nuclei. Such a filter could be applied within the Alpha Unit to create differing proportions of fusion products to non-fusion products on either side of the filter, allowing the fusion product-rich stream to be removed from the device. Such a filter might also be useful in enhancing direct energy conversion (since the presence of neutrals vs. charged fusion products degrades conversion efficiency), and/or could be used to recirculate fuel-rich mixtures to the electrode section of the Alpha Unit for consumption. Similar filters designed to be selectively permeable to different atoms or molecules could be used for operation of the Alpha Unit with both the p-B11 reaction and in other fusion reactions. Multiple filters designed for one or more atoms/molecules could also be used in combination with one another.

Additionally, in many reactions the fusion products (such as helium in the case of the p-$B^{11}$ reaction) will be some of the lightest atoms in the system, particularly once many reactions have occurred (e.g., when much of the hydrogen has been consumed in the p-$B^{11}$ reaction). As a result, these fusion products will tend to concentrate near the inner electrode, where they can be easily removed. Alternatively, in reactions where the fusion products tend to be amongst the heaviest atoms in the system, they will tend to concentrate near the outer electrode, and they can be easily removed from this site as well. In either case, the separation efficiency of the Alpha Unit will assist in removing a high proportion of the fusion products without removing a high proportion of the fusion fuel.

Monitoring and Control Systems

Effective operation of the Alpha Unit will require the ability to monitor and control the device. Many different techniques may be used, including:

MRI/NMR. For example, proton NMR could be used to measure the movement of hydrogen atoms in 3 dimensions, in real-time, within the device. In cases such as p-$B^{11}$ which use hydrogen as a fuel, this could be useful to monitor the disappearance of the protons (indicating consumption in fusion reactions), as well as for other purposes.

Optical sensors, such as ultra-high speed cameras. For example, during the operation of our Alpha Units, we record p-$B^{11}$ reactions using an ultra-high speed camera with one or more helium filters, which selectively pass light at helium's spectral frequency. Light intensity in the camera's field of view corresponds to the number of helium nuclei present at a particular point (which correlates to the number of fusion reactions taking place, energy generated, etc.).

Heat/temperature sensors, which could be useful for monitoring integrity of materials, rate of energy generation, cooling system performance, etc.

Control systems integrated with MRI/NMR, optical sensors, heat/temperature sensors, or other sensors to control operating parameters (e.g., rate of fuel input, rate of fusion product removal, flow of working fluid for thermal energy capture, amplitude and duration of pulses applied to the inner electrode).

Applications

Electricity Generation

The most obvious application of the Alpha Unit is in stationary electricity generation applications, including:

New build power plants, either central (utility-scale) or distributed (e.g., building-scale). These plants may be in rural, suburban, or urban settings on land, or may be applied in sub-sea environments. In distributed generation applications, a building relying on electricity from one or more Alpha Units might choose to avoid connecting to the power grid, since the Alpha Units would be capable of satisfying 100% of the building's electricity need.

Repowering of existing nuclear, coal-fired, gas-fired, and other conventional power plants. In this case, the switchyard, transmission interconnection, generators, and other components of the existing power plant might continue to be used, with only the boiler being removed and replaced with one or more Alpha Units.

Because of its flexible size and relatively simple construction, the Alpha Unit could also be used to generate electricity in non-stationary settings. For example:

Mobile electronic devices (e.g., cell phones, laptop computers, tablets)

Transportation devices/vehicles (cars, buses, trains, planes, lighter-than-air aircraft, helicopters, ships, submarines, satellites, spacecraft, space stations, etc.)

As a replacement for pumps (e.g., self-propelled pigs for pipelines)

Propelling Device

The Alpha Unit is primarily contemplated as a closed device whereby energy generated by fusion reactions is extracted from the Alpha Unit using either direct energy conversion or thermal energy conversion. Alternatively, an Alpha Unit could be used as a device to propel an object attached to the Alpha Unit (e.g., a vehicle, either on Earth or in space) by directing a flow of particles out of the Alpha Unit. The high velocities of particles within the Alpha Unit would result in a large reactive force when those particles are directed outward, propelling the Alpha Unit and the object to which it is attached at a high rate of speed.

What is claimed is:

1. A method of causing fusion between particles, comprising:
providing a magnet configured to generate an axial magnetic field;
providing a cylindrical chamber located in said magnetic field;
providing a target in said cylindrical chamber;
providing a discharge electrode located in said cylindrical chamber;
providing a voltage between said discharge electrode and an inner surface of said chamber to develop an electric field perpendicular to said magnetic field;
supplying hydrogen gas into said cylindrical chamber;
applying a voltage between said discharge electrode and an inner surface of said chamber containing said hydrogen gas to thereby create a plasma of ions and neutrals from said hydrogen gas in said chamber;
said electric and magnetic fields being configured to cause said plasma of ions and neutrals to rotate within said cylindrical chamber by ion-neutral coupling;
providing an electron emitter in said chamber configured to emit a quantity of electrons in said chamber under temperature conditions sufficient to reduce a Coulomb barrier between two approaching nuclei in said plasma by virtue of the collective negative charges of said quantity of electrons;
said rotation of ions and neutrals being configured to induce a force that causes hydrogen atoms and protons in said chamber to press against the electron emitter;
wherein a fusion reaction is caused to occur between neutral particles in said plasma and said target.

2. The method of claim 1, wherein the electron emitter comprises lanthanum hexaboride ($LaB_6$).

3. The method of claim 1, wherein the electron emitter is connected to ground potential.

4. The method of claim 1, wherein said target is stationary within said chamber.

5. The method of claim 1, wherein said target rotates within said chamber.

6. The method of claim 1, wherein rotation of hydrogen atoms in said chamber is configured to cause neutrals and ions to be pushed to an inner surface of the discharge electrode by rotation of hydrogen atoms in said chamber, whereby densities of said neutrals and ions can be increased in dependence on the rate of rotation, resulting in a correspondingly higher rate of fusion, said rate of fusion being proportional to the product of the densities of reactants.

7. The method of claim 2, wherein:
collisions between rotating hydrogen atoms and ions and a stationary $LaB_6$ emitter result in increase in temperature of the target, giving rise to additional emitted electrons, thereby creating a further lowering of the Coulomb barrier and causing addition fusion reactions, which release energetic charged particles of MeV energies; said charged particles dissipating their energies inside the $LaB_6$ target, resulting in a higher temperature.

8. The method of claim 1, wherein:
ionization of hydrogen by charged particles from fusion is configured to lower the resistivity of the hydrogen medium, giving rise to a higher current between the discharge electrode and an outer electrode in said chamber, where this higher ion current impinges upon the outer electrode such that the increased population of electrons lower the coulomb barrier, enabling additional low-energy ions and neutrals to fuse by their proximity to each other, through quantum tunneling.

9. The method of claim 1, wherein
an axial magnetic field is created by said magnet, which causes rotation of fusion reactants, where it produces elements and isotopes from rotating reactants.

10. The method of claim 1, wherein energetic alpha particles ($He^4$) are produced as a result of said fusion reaction; the method further comprising using said energetic alpha particles for direct conversion to electrical energy.

11. The method of claim 1, wherein energetic alpha particles ($He^4$) are produced as a result of said fusion reaction; the method further comprising slowing down said alpha particles, which are emitted in a same direction as original rotating hydrogen atoms, thereby yielding a charging current to an external power supply.

12. The method of claim 1 wherein said target comprises the element Boron having a dominant isotope of $B^{11}$.

13. The method of claim 12, wherein the rotation of ions and neutrals in said chamber causes plasma particles to undergo the following fusion reaction as a result of repeated collisions between $B^{11}$ and hydrogen neutrals or protons:

$$p + B^{11} \rightarrow 3He^4 + 8.7 \text{ MeV energy}.$$

14. A method of causing fusion between particles, comprising:
providing a vacuum chamber;
providing outer and inner electrodes defining a space therebetween within said vacuum chamber;
introducing positive and negative ions into said space within said vacuum chamber;
providing a series of alternating current (AC) fields on the circumference of said outer and inner electrodes, thereby driving said positive and negative ions introduced into said space within said vacuum chamber in rotation by an oscillating electric field;
providing neutrals into said space, whereby said neutrals are driven in rotation around an axis of said electrodes through collisions with said positive and negative ions; and increasing the frequency of such AC fields, thereby increasing the rotational speed of rotating ions and neutrals around said axis through resonant wave-particle interactions, said rotating ions and neutrals being configured to thereby cause a fusion reaction among said ions and neutrals.

* * * * *